(No Model.)
J. KROOG.
APPLIANCE FOR LOCKING FILTER PRESSES.
No. 379,518. Patented Mar. 13, 1888.
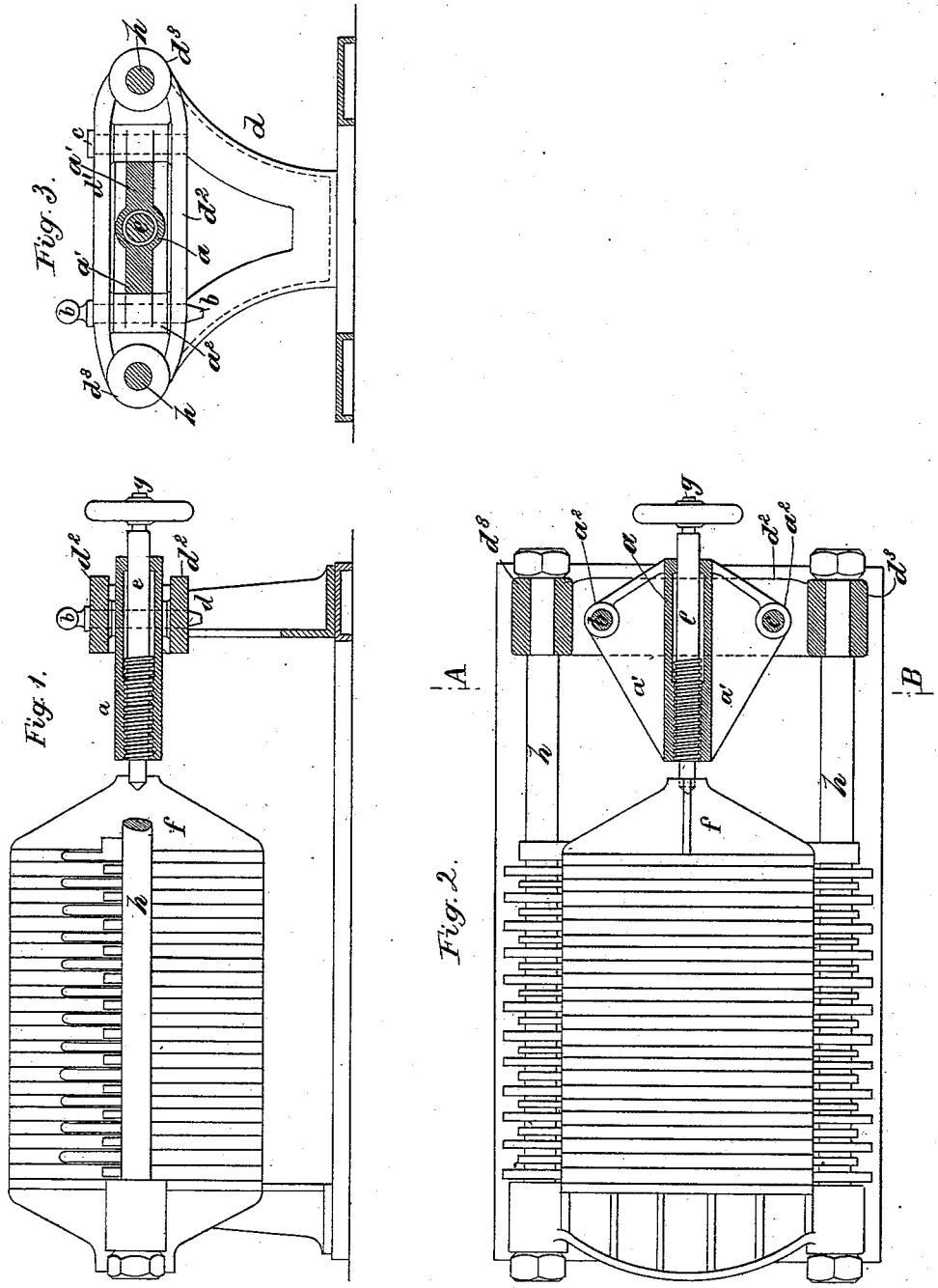
Witnesses:
J. A. Rutherford
Robert Everett
Inventor:
Johann Kroog,
By James L. Norris
Atty.

UNITED STATES PATENT OFFICE.

JOHANN KROOG, OF HALLE-ON-THE-SAALE, PRUSSIA, GERMANY.

APPLIANCE FOR LOCKING FILTER-PRESSES.

SPECIFICATION forming part of Letters Patent No. 379,518, dated March 13, 1888.

Application filed March 16, 1887. Serial No. 231,150. (No model.) Patented in Germany September 26, 1879, No. 9,641, and in Austria-Hungary, July 15, 1880, No. 40,651 and No. 1,950.

*To all whom it may concern:*

Be it known that I, JOHANN KROOG, of the city of Halle-on-the-Saale, in the Kingdom of Prussia and German Empire, have invented a certain new and useful Improvement in Appliances for Locking Filter-Presses, (for which I have obtained patents in Germany dated September 26, 1879, No. 9,641, and in Austria-Hungary, dated July 15, 1880, No. 40,651 and No. 1,950,) of which the following is a specification, reference being had to the accompanying drawings, and to the letters of reference marked thereon.

This invention relates to improvements in appliances for locking filtering-presses, its object being to construct the said appliances in such a manner that the filtering-press may be easily and securely locked and readily unlocked when required.

In the accompanying drawings, forming part of this specification, Figure 1 is a side elevation of a filtering-press with my improvement partly in section. Fig. 2 is a plan thereof, also partly in section. Fig. 3 is an end elevation of the standard, showing my said improvement partly in section.

The improved locking device is formed by the non-rotating nut $a$ being held in position by the bolts $b$ and $c$ in the standard $d$, and the threaded spindle $e$ arranged within the said nut $a$. One end of the said spindle $e$ enters a recess of the head-piece $f$, and the other end is formed into a square part, $g$, to fit a hand-wheel or key for turning the spindle, and thereby locking or unlocking the filtering-press.

In order to unlock or release the filtering-press it is simply necessary to turn the spindle $e$ back sufficiently to disengage its end from the recess in the head-piece $f$. Thereupon the bolt $b$ is pulled out, and the nut $a$, being fulcrumed on the bolt $c$, is swung around, thus giving sufficient room to allow of shoving back the movable head-piece $f$.

The standard $d$ is provided at its upper end with a yoke or frame composed of top and bottom horizontal plates, $d\ d^2$, joined at their ends by eyes $d^3$, through which pass the tie-rods $h$, that support the filtering-press.

The nut $a$ is held stationary by the bolts $b$ and $c$ in the space between the upper and lower plates comprising the yoke or frame, and to effect this the nut is formed integral with rigid arms $a'\ a'$, projecting horizontally in opposite directions from the sides of the nut. The outer extremities of these rigid arms are provided with the vertical perforated hubs $a^2$ for the passage of the bolts $b\ c$. The upper and lower ends of these hubs bear, respectively, against the upper and lower plates, $d'\ d^2$, so that the nut when released can swing in a true horizontal plane and be supported in such plane by one of the hubs.

It will be seen that this improved locking device is of simple construction and admits of most readily and quickly locking and unlocking filtering-presses.

I am aware that in a baling-press a yoke carrying a swiveled rotating nut has been provided with bolts, so that by removing one bolt the yoke could be swung away from the line of the press-box, as in Letters Patent No. 194,888. Such, therefore, I disclaim.

Having thus described my invention, what I claim as new, and desire to secure by Letters Patent, is—

In a filtering-press, the combination of the standard $d$, provided at its top with the upper and lower fixed plates, $d'\ d^2$, joined at their ends, the horizontal non-rotating nut $a$, having the horizontal rigid arms $a'$, provided with perforated hubs $a^2$, arranged between and bearing against the upper and lower plates on the standard, the rotating screw $e$, arranged in the nut, and the bolts $b$ and $c$, passing through the rigid arms of the nut and the said upper and lower plates, substantially as described.

In testimony whereof I have signed my name to this specification in the presence of two subscribing witnesses.

JOHANN KROOG.

Witnesses:
 A. D' HEUREUSE,
 EMIL WOLF.